R. VUILLEUMIER.
SELF ADJUSTING FLUID TIGHT PACKING.
APPLICATION FILED MAY 2, 1918.

1,363,378. Patented Dec. 28, 1920.

INVENTOR:
Rudolph Vuilleumier
BY
Chas. M. Chapman
ATTORNEY.

UNITED STATES PATENT OFFICE.

RUDOLPH VUILLEUMIER, OF NEW ROCHELLE, NEW YORK, ASSIGNOR TO THE SAFETY CAR HEATING & LIGHTING COMPANY, A CORPORATION OF NEW JERSEY.

SELF-ADJUSTING FLUID-TIGHT PACKING.

1,363,378.    Specification of Letters Patent.    Patented Dec. 28, 1920.

Application filed May 2, 1918. Serial No. 232,007.

*To all whom it may concern:*

Be it known that I, RUDOLPH VUILLEUMIER, a citizen of the United States, residing in New Rochelle, county of Westchester, and State of New York, have invented a new and useful Improvement in Self-Adjusting Fluid-Tight Packings, of which the following is a description.

This invention relates to the art of compressors and similar apparatus wherein fluid-tight joints, or sealing devices, are required, and, particularly, to a fluid-tight packing or valve for rotating, or circularly moving, members or parts, so constructed and adapted to its work as to be self-adjusting.

Among the objects of my invention may be noted the following: to provide a fluid-tight sealing device or packing with which friction can be reduced to a minimum; to provide a fluid-tight sealing device or packing so constructed as to be self-adjusting and to automatically compensate for wear caused by friction of the parts; to provide a fluid-tight packing which automatically maintains perfect sealing contact with its coöperating part or member, irrespective of minor external disturbances; to provide a fluid-tight packing which will automatically compensate for all movements of the shaft abnormal to the axis of the latter, so as to overcome all tendency to unseat or disturb the packing or valve during rapid operation of the shaft; to provide a fluid-tight packing adapted to respond to the objects noted in the foregoing and which also operates to hold or maintain the lubricant and prevent the escape of the pressure-fluid; and to provide a simple, inexpensive, compact and effective device of the character noted having the advantages and functions above outlined and which requires minimum attention and care for maintenance, and which is reliable mechanically and functionally.

With the above objects in view and others which will be detailed during the course of this description, my invention consists in the parts, features, elements and combinations thereof hereinafter described and claimed.

In order that my invention may be clearly understood, I have provided drawings wherein.

Figure 1:
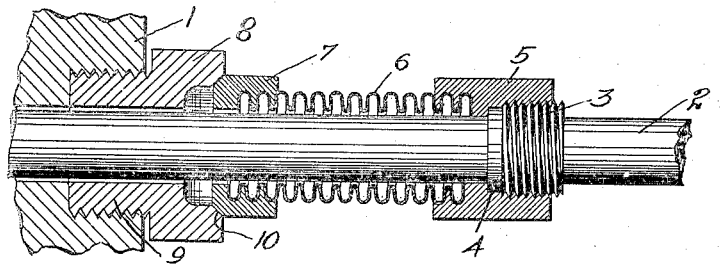
Figure 1 is a sectional elevation showing one form of my invention, wherein the sealing device, packing, valve or closure member is held resiliently to its work and is carried by a moving member.

Referring to Fig. 1, the numeral 1 indicates, for example, a cylinder, tank or holder, of a high speed rotary compressor, used in connection with an automatic refrigerating machine, and 2 the rotating or circularly moving shaft, which has a screw-threaded portion 3 and flange or collar 4 adapted to connect with, and rigidly hold, a coupling 5, which is internally screw-threaded and bored, at one end, for the purpose. The coupling 5, at its other end, is internally bored and screw-threaded for the reception of a resilient, tubular, fluid-tight member 6, the exterior conformation of which is in the form of a spiral, or screw, or helical corrugations, and the end of which is adapted to screw into the coupling. This member has the function of a compound spring and acts to press the sealing device or valve 7 against the valve-seat member 8 having a reduced externally screw-threaded portion 9 adapted to be removably secured in the cylinder or holder 1, which is bored and internally screw-threaded coöperatively. The member 6 is sealed to the coupling 5 and valve 7 by cementing or sweating, thus making fluid-tight joints, the form of joint between the coupling 5 and members 3 and 4 of the shaft 2 also forming a fluid-tight joint. The coöperating parts of the valve and valve-seat, indicated by 10, are suitably formed for smooth, coöperative action, and, as before stated, the resilient member 6 normally tends to hold the valve against the seat with sufficient pressure to retain the lubricant and prevent the escape of the pressure-fluid; and said member 6 is so chosen as to flexibility or resiliency as to be capable of maintaining the proper alinement of the valve 7 relatively to the circularly moving shaft 2, and preserve its proper co-action with the seat of the member 8, notwithstanding minor vibrations or disturbances in the circular movement of the shaft 2. In other words, the member 6 is capable of not only retaining the valve 7 firmly against the valve-seat member 8; but, is capable of so carrying the valve 7 as to prevent it from lagging relatively to the shaft 2 in the rotation of the latter, notwithstanding the friction at 10 and the high speed of the shaft. Hence, the valve, sealing member or closure 7 is at all times held squarely to its seat and is capable of maintaining a fluid-tight joint or contact with the member 8, which is automatically retained, regardless of unavoidable wear which may occur at the surfaces 10; and it is to be understood that the extensibility of member 6 is an important characteristic, in that it will compensate for any wear at the contact surfaces 10 and will also counterbalance properly the unbalanced and high pressure of the fluid tending to separate the members at 10.

Figure 2:
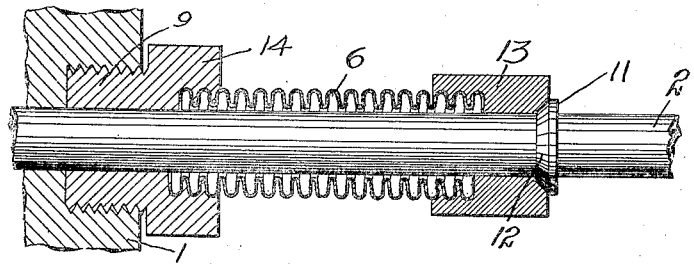
Fig. 2 is a similar view, showing another form of my invention, wherein the sealing device or member is carried by a stationary part.

In the form of my invention shown in Fig. 2, the circularly moving shaft 2 carries the collar or flange 11 having the inclined or angularly disposed valve-face 12, the valve-seat member 13, in this instance, being connected, in manner as above described, to the resilient member 6, which, in turn, is connected to the removable member 14 screwed into the tank or holder 1. The characteristics of the member 6, in this instance, are the same; but, the operation of the parts is different, in that the valve is fixed to the shaft and rotates with it, while the valve-seat member 13 is held resiliently in engagement with the valve-face by the member 6, which is held from circular movement, instead of being rotary, as in the construction of Fig. 1. The seat of the valve, in this form as well as in the form of Fig. 1, is inclined so as to accurately fit and coöperate with the valve-face, and the arrangement of the coöperating surfaces is such as to firmly hold the valve seated, notwithstanding excessive vibration which may occur during the operation of the shaft 2, tending to effect separation of the members by pressure at an angle to the long axis of the shaft. This arrangement enables all the lines of force of the resilient member, in both forms of my invention, to be effectively exerted upon the valve member connected thereto, resulting in causing the said member to cling with great force to its coöperating member, thus overcoming all tendency of the vibrations of the shaft to unseat the valve and cause leakage. This is an important feature of my invention upon which I desire to lay stress.

Figure 3:
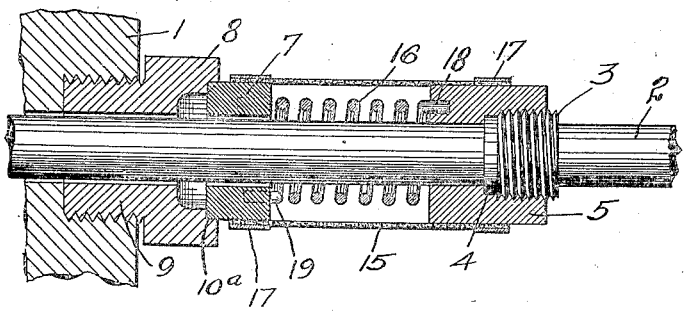
Fig. 3 is a similar view showing still another form of my invention, wherein the sealing device or member is carried by a moving part and held to its work by a different medium and different closure.

In Fig. 3, the circularly moving shaft 2, screw-threaded portion 3, collar 4, coupling 5, valve-seat member 8, and valve 7 are all the same as in Fig. 1, barring slight changes in form of the members 5, 7 and 8 resulting from the omission of the resilient member 6, and change in the form of the coöperating surfaces of members 7 and 8. The form given such surfaces is, as shown at 10ª, right-angular, this form preventing the members from separating radially due to any tendency to flex on the part of member 7. In this form of my invention a flexible fluid-tight sheath or member 15 is used in combination with a coiled spring 16, the sheath being sealed to the coupling 5 and valve 7 in any suitable manner and firmly held or clamped to the respective members by encircling bands 17. The spring 16 has one end bent and sunk in the coupling 5, as at 18, and the opposite end likewise connected to the valve 7, as at 19, the expansive character of the spring tending to normally hold with sufficient pressure the valve 7 against the seat-member 8, so as to properly maintain coöperative engagement of the surfaces 10ª and counterbalance the internal fluid pressure, as above described with reference to the form of Fig. 1. If desired, in this form of my invention, the spring 16 may be omitted, in which case dependence will be placed upon the connecting sheath or member 15, which will be in the form of a flexible, fluid-tight coupling so applied and connected that internal pressure will tend to maintain the necessary contact between the valve and its seat at the surfaces 10ª.

Figure 4:
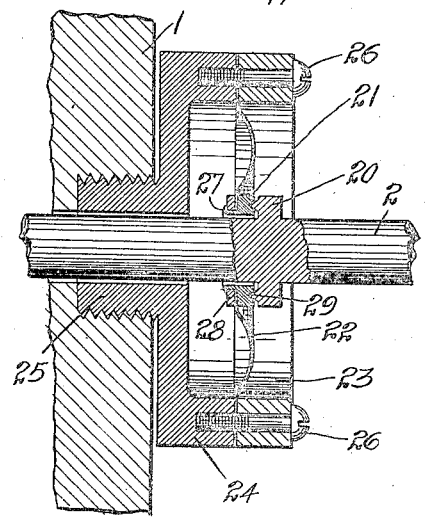
Fig. 4 is a similar view showing a still further form of my invention wherein the sealing device or member is carried by a movable part and held to its work by a different form of means, this view also showing a different form of packing or closure member.

In the form of my invention shown in Fig. 4, the circularly moving shaft carries the fixed valve-member 20, which coöperates with the valve-seat or member 21, which is carried by the flexible or resilient diaphragm 22 rigidly clamped between the outer ring 23 and inner ring 24, formed at its rear with a tubular, externally screw-threaded member 25 adapted to engage removably the screw-threaded bore of the tank or holder 1. The screws 26 pass through the outer ring, the diaphragm, and into the inner ring 24, the diaphragm thus suspending the valve-seat member 21, which is connected centrally thereto by means of the flanged tubular portion 27 turned back upon a ring or collar 28, thus firmly holding the diaphragm and seat member together, with the diaphragm clamped between the seat member and collar 28. In this form of my invention, I have shown the coöperating faces 29 of the valve and seat as V-shaped or angular, it being understood, however, that this form of angular, coöperative surfaces may be variously made within the scope of my invention.

The diaphragm 22, which is resilient or elastic in all directions, may be assisted, in its work of holding the valve-seat yieldingly against the valve 20, by a spring or by fluid pressure, if desired, the same as in the form of my invention shown in Fig. 3. The form of the diaphragm 22 may be varied, within the scope of my invention; but, I have adopted the form shown in Fig. 4 as answering the requirements, the same being shown as concavo-convex.

Figure 5:
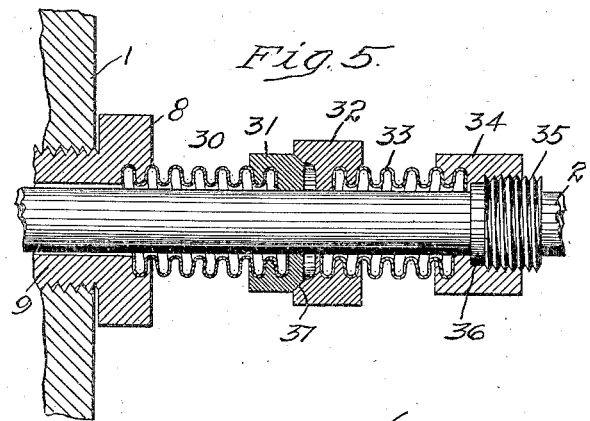
Fig. 5 is a similar view showing a form of my invention wherein both parts of the valve or seal are flexibly supported.

In the form of my invention shown in Fig. 5, the two valve or sealing members are shown as flexibly supported; that is to say, the tank 1 has screwed therein the portion 9 of the member 8, the latter having threaded therein a resilient, tubular, fluid-tight member 30, similar to the member 6 of Figs. 1 and 2, said member 30 having threaded thereon the valve member 31, the latter being thus flexibly supported from a stationary part, as is member 13 in Fig. 2. A coöperating valve or sealing member 32 is threaded upon a member 33, similar to member 30, which in turn is threaded into one end of coupling 34, the other end of which is screw-threaded and centrally bored to receive a screw-threaded portion 35 and collar 36, respectively, on the shaft 2, the coupling and coöperating parts being similar to the parts 3, 4 and 5 Fig. 1. Thus the sealing members 31 and 32 are both resiliently supported, relatively yielding, and flexibly interacting to seal the seat at 37 against fluid pressures, vibration, shaft movements abnormal to its axis, and escape of lubricant.

From the foregoing, it will be readily understood that my invention is not limited to the particular shape of the parts shown, nor to the material of which the parts may be made, nor to the particular form of the resilient members employed to create pressure and maintain coöperative relation between the valve-members. Nor is my invention limited to the method of attachment of the various parts, viz., whether they be movable, circularly movable, stationary, or maintained in coöperative engagement and relation by pressure resulting from the resiliency of the agencies used in their construction, or by fluid pressure, or pressure differences, or by means of springs and pressure in combination.

Having thus described my invention, what I claim and desire to secure by Letters Patent is:

1. In combination with a fixed part of a high pressure tank, a high speed shaft journaled to rotate in said part; a high pressure seal for said tank and shaft comprising a valve-seat member through which said shaft extends; a valve-member, for coöperation with said seat member, the axis of which is coincident with the longitudinal axis of the shaft; and a tubular, fluid-tight, expansible spiral means sealed at one end to one of said members and adapted to hold it firmly against the other member by pressure applied parallel to its own axis and that of the shaft.

2. In combination with a fixed part of a tank, a high speed shaft journaled to rotate in said part; a high pressure seal for said tank and shaft comprising a valve-seat member surrounding said shaft; a valve-member surrounding said shaft for coöperation with said seat member, the axis of which is coincident with the longitudinal axis of the shaft; and a tubular, fluid-tight, longitudinally resilient spiral means surrounding said shaft and sealed at one end to one of said members, and adapted to hold it firmly against the other member by pressure applied parallel to its own axis and that of the shaft.

3. A fluid-tight sealing structure having, in combination, coöperating closure members, a fixture carrying one member and a rotary part carrying the other member, the contact surfaces of said members being at an angle to their axes; and a fluid-tight controlling means comprising a tubular, longitudinally contractible and expansible member surrounding the rotary part and normally operating to forcibly hold said members together.

4. A fluid-tight sealing structure having, in combination, coöperating closure members, a fixture carrying one member and a rotary part carrying the other member, and a fluid-tight controlling means comprising an elongated, spiral, expansible member surrounding the rotary part and adapted to hold the closure members together by pressure on one of them in a direction parallel with its axis, the axis of the rotary part, and the axis of the closure member.

5. A fluid-tight sealing structure having, in combination, coöperating closure members; a fixture carrying one member and a rotary part carrying the other member; and a fluid-tight controlling means, surrounding the rotary part, for maintaining the members in engagement, comprising a tubular, spiral, resilient and expansible member having one of the closure members sealed thereto at one end thereof.

6. In combination with a fixed part of a suitable tank or holder, a shaft journaled to rotate in said part; a valve-seat member, through which said shaft extends, having means for securing it to the said part; a valve for coöperation with said member; and a tubular, fluid-tight spiral means sealed to one of said parts for maintaining the member and valve in engagement under all conditions of movement of said shaft.

RUDOLPH VUILLEUMIER.